United States Patent [19]
Danielson

[11] Patent Number: 4,598,586
[45] Date of Patent: Jul. 8, 1986

[54] COMPENSATION OF GAIN TEMPERATURE COEFFICIENT IN AN OPTICAL PICK-OFF FOR AN ACCELEROMETER

[75] Inventor: Michael S. Danielson, Wrentham, Mass.

[73] Assignee: Northrop Corporation, Century City, Calif.

[21] Appl. No.: 646,150

[22] Filed: Aug. 31, 1984

[51] Int. Cl.$^4$ .............................................. G01P 15/13
[52] U.S. Cl. .................... 73/517 B; 250/231 R
[58] Field of Search ............ 73/517 B, 517 R, 862.61; 250/231 R

[56] References Cited

U.S. PATENT DOCUMENTS 3,950,987  4/1976  Slezinger et al. ................. 73/517 R
4,277,895  7/1981  Wiklund ............................. 73/517 B

OTHER PUBLICATIONS

"Optical Pressure Sensor Description", *Applied Optics*, 1984.

Primary Examiner—Stewart J. Levy
Assistant Examiner—John E. Chapman, Jr.
Attorney, Agent, or Firm—Kenway & Jenney

[57] ABSTRACT

Apparatus for compensating an optical sensor utilizing a light emitting diode and a monolithic dual element photodiode as a null position sensor for changes in optical output efficiency or gain due to variations in temperature without knowledge of relative or absolute temperature. The optical sensor includes a light emitting diode and a dual element photodiode spaced apart from the light emitting diode and located so that each element of the dual element photodiode is equally illuminated. A pendulous mass is disposed between the light emitting diode and the dual element photodiode detector such that as it moves the amount of illumination received by each of the dual elements differs. Electrical apparatus is provided for producing a first signal proportional to the difference in output from the two photodiode elements, and this signal is used to null the position of the pendulous mass. A second signal is produced which is proportional to the sum of the outputs from the two photodiode elements, and this signal is utilized to alter the current to the light emitting diode so that the second signal is maintained at a predetermined reference level. In this way, the overall gain of the optical sensor is maintained within narrow limits to compensate for temperature induced variations in sensor gain.

3 Claims, 7 Drawing Figures

COMPENSATION OF GAIN TEMPERATURE COEFFICIENT IN AN OPTICAL PICK-OFF FOR AN ACCELEROMETER

BACKGROUND OF THE INVENTION

This invention relates to optical null position sensors and more particularly to a compensation scheme for substantially eliminating changes in optical output efficiency due to variations in temperature.

One class of accelerometer employs a pendulous mass disposed between a light emitting source such as a light emitting diode and photodiodes responsive to light. In particular, the photodiode may be a monolithic device having two elements, each of which is responsive to light radiation. Under acceleration, the pendulous mass will deflect so that one of the photodiode detectors will receive more illumination than the other. The relative amounts of illumination can be measured and differenced to generate an error signal which can be used to drive the pendulous mass back to a null position. Oftentimes the pendulous mass is driven back to null by means of electric coils on the mass interacting with a permanent magnet. The amount of current in the coils required to maintain the pendulous mass at null is then an indication of the acceleration of the accelerometer and the vehicle to which it is attached.

Such a system is a closed loop one in that deviations from null are measured and fed back to reestablish the null condition. As in all closed-loop systems, gain levels must remain within certain limits or else the system can go unstable. Thus, if the overall gain of the light emitting diode/photodetector system were to change, the corresponding gain might be such as to destabilize the system. Changes in gain can come about as a result of component variations as a function of temperature.

One way to compensate for changes in temperature would be to measure temperature directly and use this reading to compensate the readings from the photodetectors. This technique, of course, requires separate temperature sensing elements which add to the cost and complexity of the accelerometer apparatus.

It is therefore an object of this invention to provide an accelerometer having an optical sensing system and incorporating temperature compensation without the need for measuring temperature directly.

It is a further object of the invention to provide such a system which is highly effective and reliable.

A still further object of the invention is such a system which is simple and inexpensive to build and operate.

SUMMARY OF THE INVENTION

The accelerometer disclosed herein includes a mass disposed within an optical sensing unit and closed loop apparatus for maintaining the mass substantially at a null position within the optical sensing unit during acceleration. The optical sensing apparatus comprises a light emitting source and a dual element photodiode detector spaced apart from the source and located for equal illumination of each element of the dual element photodiode by the light source. The motion of the mass alters the illumination so that it is no longer equal on each of the elements. Electrical apparatus is provided for producing a first signal proportional to the difference in output from the two elements of the dual element photodiode detector. Circuitry is also provided to produce a second signal proportional to the sum of the outputs from the two elements of the dual element photo-detector. This second signal is utilized to alter the current to the light emitting source so as to maintain the second signal at a predetermined reference level. In this way, variations in overall system gain due to temperature changes are substantially eliminated.

BRIEF DESCRIPTION OF THE DRAWING

The invention disclosed herein will be understood better with reference to the following drawing of which.

DESCRIPTION OF THE PREFERRED EMBODIMENT

Figure 1:
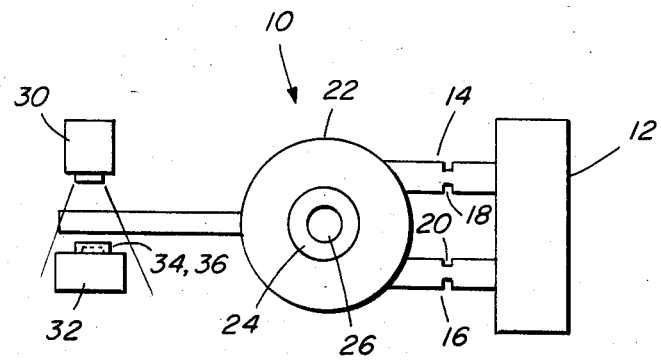
FIG. 1 is a schematic representation of an accelerometer as disclosed herein.
Figure 2:
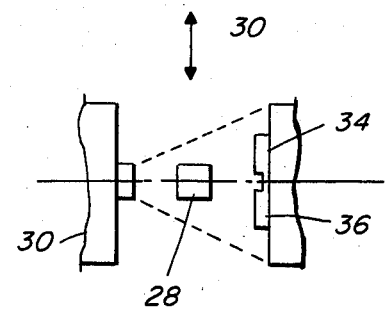
FIG. 2 is a schematic diagram of the optical pick-off of the accelerometer of FIG. 1.

With reference first to FIG. 1, an accelerometer 10 adapted for measuring accelerations into and out of the plane of FIG. 1 includes a support 12 to which flexible arms 14 and 16 are rigidly attached. The arms 14 and 16 include cut out portions 18 and 20 to provide the appropriate amount of flexibility. The arms 14 and 16 support an electrical coil 22 having a central opening 24. The opening 24 fits over a permanent magnet 26. Attached to the coil 24 is a shadow bar 28 which is disposed between a light emitting diode source 30 and a dual element photodiode 32. The photodiode 32 is shown in more detail in FIG. 2. The photodiode 32 consists of a first element 34 and a second element 36. In FIG. 1, the elements 34 and 36 are located one above the other on the photodiode 32. Thus, for accelerations into and out of the plane of FIG. 1, which would be along the arrow 38 in FIG. 2, the shadow bar 28 will be deflected because of the flexible nature of the arms 14 and 16. If, for example, the shadow bar 28 deflects downwardly in FIG. 2, the photodiode element 34 will receive more illumination than the photodiode element 36. The relative output from the photodiode elements 34 and 36 can then be used to energize the coil 22 so as to interact with the permanent magnet 26 in a way which will drive the shadow bar 28 back to its null position. The amount of current needed to maintain null is then an indication of the amount of acceleration of the support 12 of the accelerometer 10. In such an arrangement, the shadow bar 28 is maintained at null with a closed loop control system.

Because the shadow bar 28 is maintained at null with a closed loop system, the overall loop gain must remain within certain limits or else the system can become unstable, as is commonly the case with closed loop automatic control systems. It has been found that the characteristics of the light emitting diode 30 and the photodiode 32, including the photodiode elements 34 and 36, vary with temperature. Such variations directly affect the loop gain and can lead to instabilities if compensation is not provided.

The present invention will now be described in detail with reference to FIG. 3. The light emitting diode or LED 30 is aligned to illuminate equally the photodiode elements 34 and 36. The photodiode elements 34 and 36 are connected across the inputs of differential amplifiers A1 and A2 respectively, with feedback provided to the inverting inputs by R1 and R2. The capacitances C1 and C2 provide high frequency roll off for stability. This configuration converts the photo currents $i_a$ and $i_b$ generated by LED 30 illumination to output voltages $V_a$ and $V_b$. The output voltages $V_a$ and $V_b$ are differenced by a differential amplifier A3 producing a null output voltage $V_n$. The output voltage $V_n$ is then utilized in other circuitry (not shown) to drive the coil 22 of FIG. 4 so as to maintain the shadow bar 28 at its null location. As stated above, the output voltage $V_n$ is an indication of the level of acceleration of the accelerometer 10. It has been found that as temperature varies, $V_a$ and $V_b$ will vary. Since $V_a$ and $V_b$ are utilized in a closed-loop system, $V_n$ will not change due to changes in $V_a$ and $V_b$ since the shadow bar 28 will move to accommodate an apparent change in $V_n$ caused by differences induced in $V_a$ and $V_b$ by temperature. Therefore, changes in $V_a$ and $V_b$ are directly gain changes. The apparent changes in $V_n$ are a by-product. As stated above, such gain variation can lead to instabilities in the control system.

Figure 3:
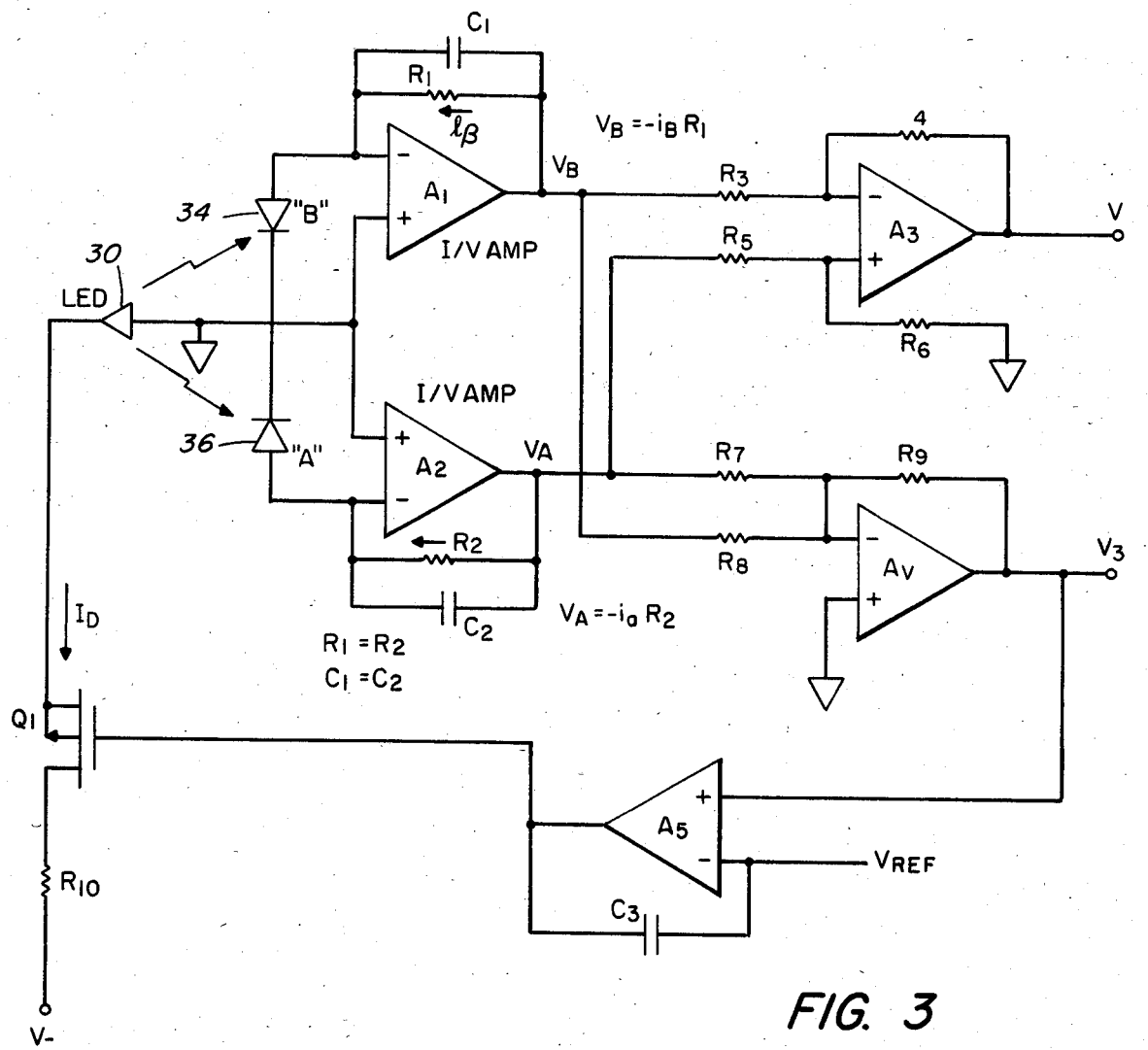
FIG. 3 is an electrical schematic of a compensation network.

Still referring to FIG. 3, the output voltages $V_a$ and $V_b$ are summed and inverted by an amplifier A4 producing an output $V_s$. The signal $V_s$ is used as an error signal for compensating gain variations as discussed above. The output $V_s$, representing the sum of the outputs $V_a$ and $V_b$, is applied to one input of a differential amplifier A5 and a voltage $V_{ref}$ is applied to the other input of the differential amplifier A5. The output from the differential amplifier A5 is thus the difference between the signal $V_s$ and the signal $V_{ref}$. This difference controls a series pass element Q1 which is preferably a mosfet or fet device to adjust the current $I_D$ to the LED 30 so as to maintain $V_s$ substantially equal to $V_{ref}$. Any component capable of handling the required current is acceptable. A capacitor C3 is provided around the amplifier A5 to provide high frequency roll off for stability and a resistor $R_{10}$ is used for current limiting.

During operation, when the temperature of the accelerometer 10 changes, the overall gain of the interaction of the LED 30 with the photodiode detectors 34 and 36 will cause variations in the output voltage $V_n$ even when the acceleration of the accelerometer 10 remains constant. By summing the outputs from the photodetectors 34 and 36, such gain variation is detected and compensated for, thus maintaining $V_n$ substantially unaffected by temperature variations.

Figure 4:
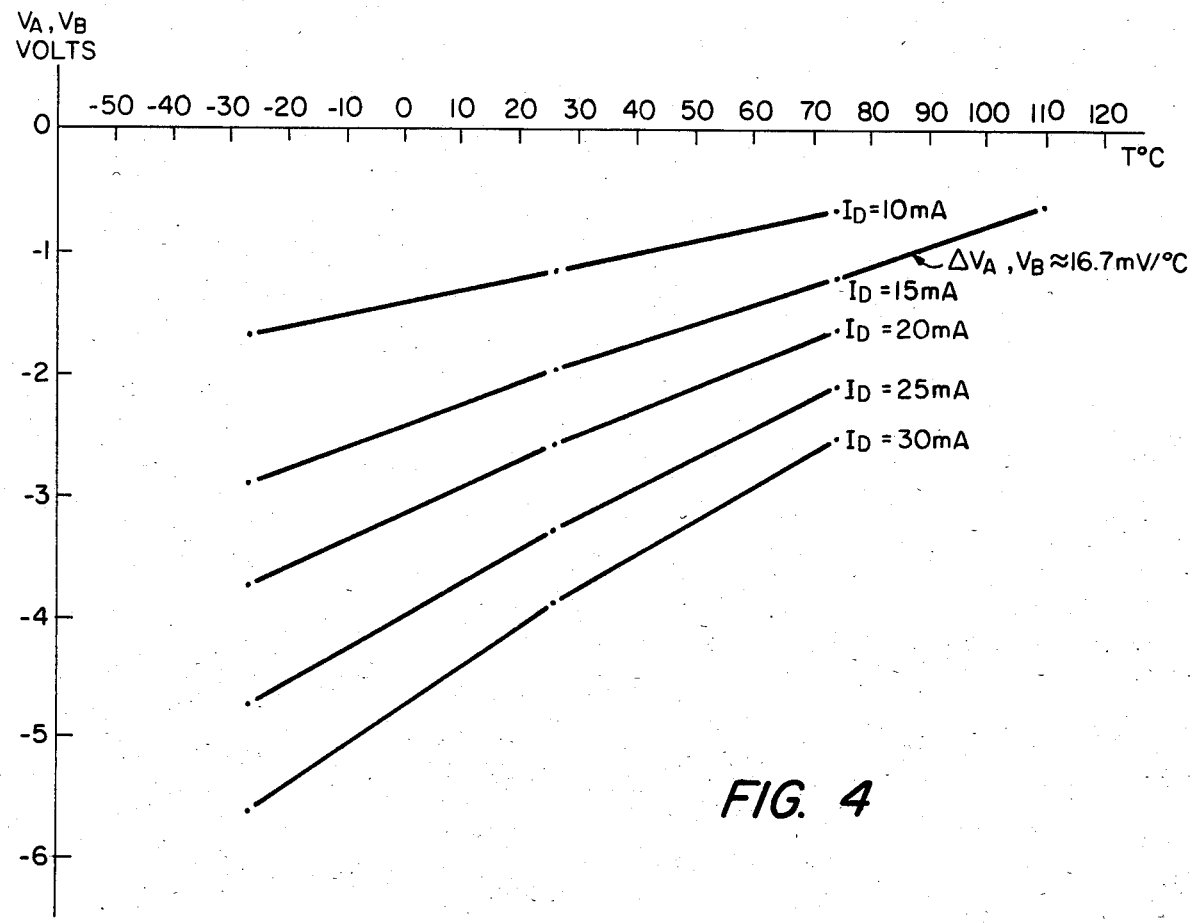
FIG. 4 is a graph of the voltages $V_a$ and $V_b$ versus temperature for an uncompensated optical pick-off.
Figure 5:
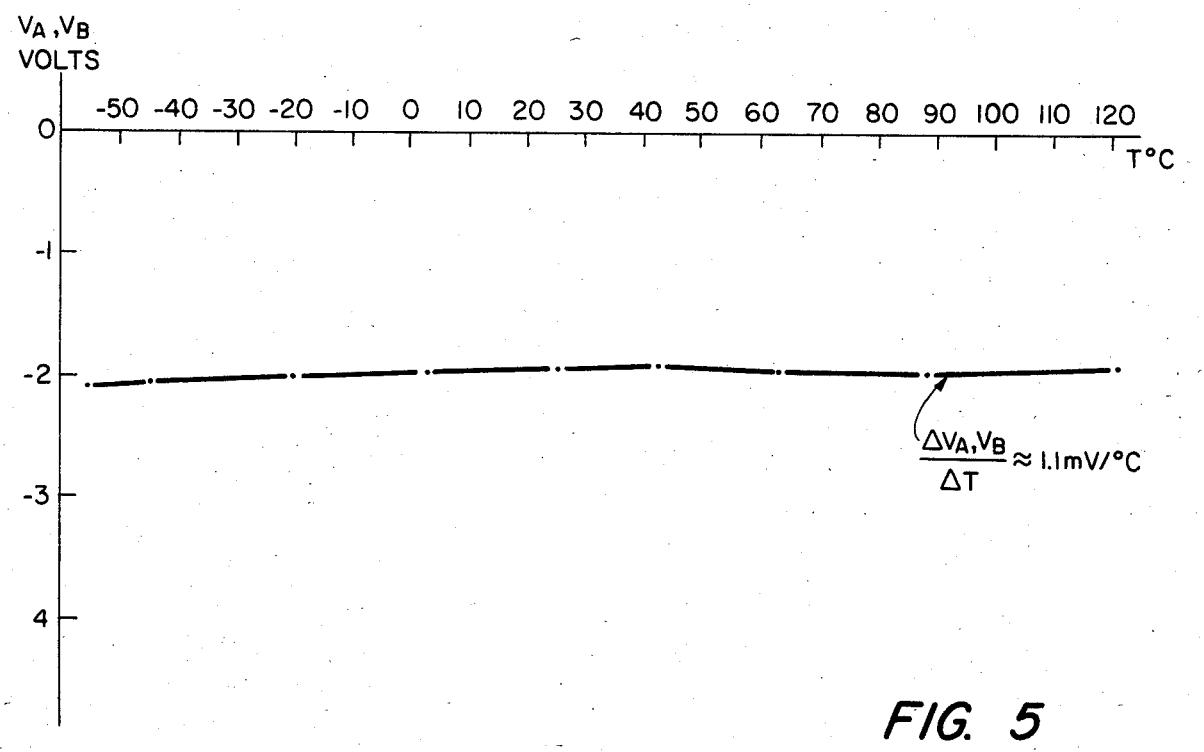
FIG. 5 is a graph of the voltages $V_a$ and $V_b$ versus temperature with gain compensation.

FIGS. 4 and 5 illustrate changes in $V_a$ and $V_b$ with temperature with and without gain compensation. With reference to FIG. 4, it is seen that for a current $I_d$ of 15 milliamps the variation in $V_a$ and $V_b$ is approximately 16.7 millivolts per degree C. This compares with a compensated variation of the voltages $V_a$ and $V_b$ with temperature of approximately 1.1 millivolts per degree C. Thus, by using the gain compensation described in FIG. 3, gain changes due to temperature variations have been substantially reduced.

Figure 6:
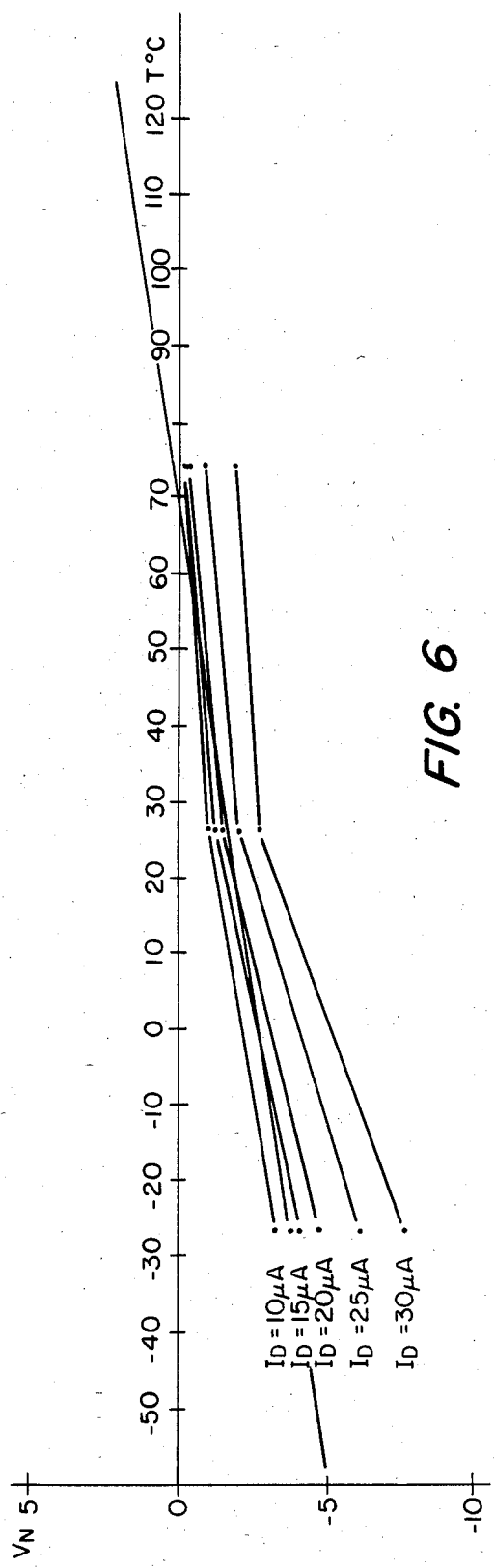
FIG. 6 is a graph of null voltage versus temperature for an uncompensated optical pick-off.
Figure 7:
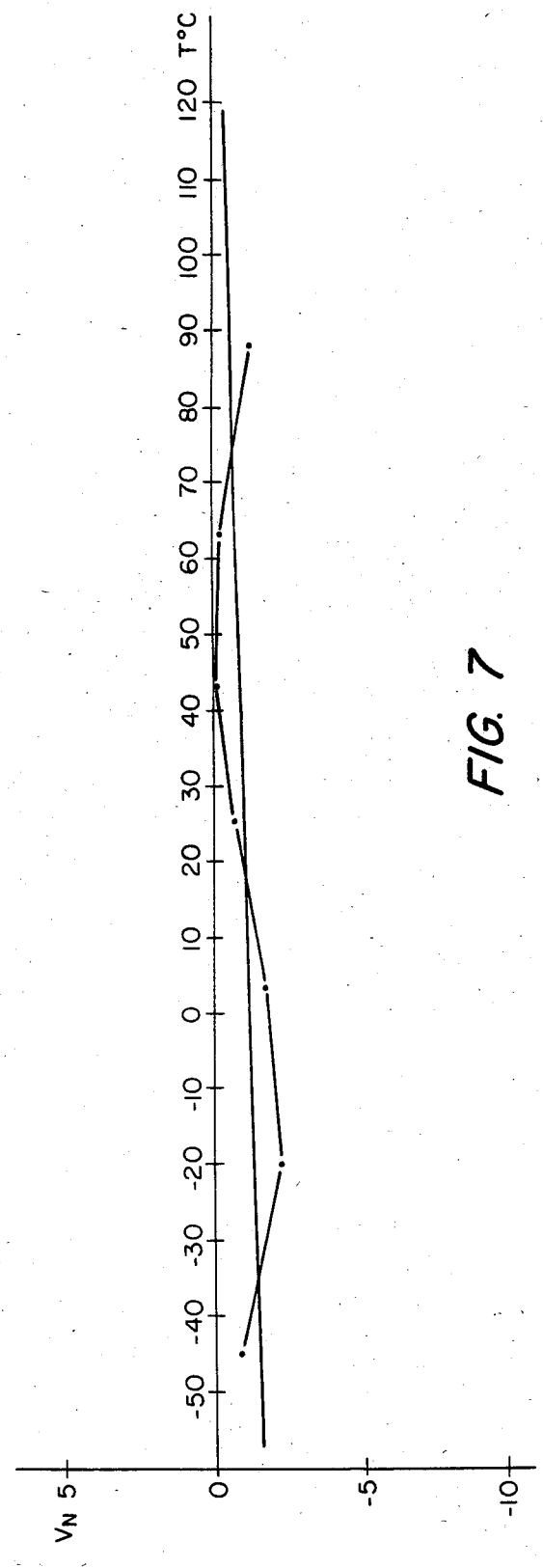
FIG. 7 is a graph of null voltage versus temperature with gain compensation.

FIGS. 6 and 7 show the effects of temperature changes on $V_n$ both with and without the gain compensation described in FIG. 3. In FIG. 6, it can be seen that the uncompensated output voltage Vn shows a temperature dependence of approximately 40.6 microvolts per degree C. This compares with a compensated variation of the output voltage $V_n$ with temperature of approximately 7.06 microvolts per degree C. as shown in FIG. 7. Thus, the variation of the output voltage $V_n$, used in a closed loop control system to control the null location of the shadow bar 28, has been substantially reduced by utilizing the compensation circuitry of FIG. 3.

It is thus seen that the objects of this invention have been achieved in that there has been disclosed gain compensation apparatus for compensating for gain variations induced by temperature in an optical pick off for use with an accelerometer. It is recognized that modifications and variations will occur to those skilled in the art and it is intended that all such modifications and variations be included within the scope of the appended claims.

I claim:

1. In an accelerometer including a mass diposed within an optical sensing means and closed loop means for maintaining said mass substantially at a null position within said optical sensing means during acceleration, said optical sensing means comprising:
    a light emitting source;
    a dual element photodiode detector spaced apart from said source and located for equal illumination of each element of said dual element photodiode by said source, the motion of said mass altering said equal illumination;
    electrical means for producing a first signal proportional to the difference in output from the two elements of said dual element photodiode detectors; and
    electrical means for producing a second signal proportional to the sum of the outputs from the two elements of said dual element photodiode detector, said second signal utilized to alter the current to said light emitting source to maintain said second signal at a predetermined reference level.

2. The apparatus of claim 1 wherein said light emitting source is a light emitting diode.

3. The apparatus of claim 1 wherein said dual element photodiode detector is of monolithic construction.

* * * * *